(12) United States Patent
Lin et al.

(10) Patent No.: US 8,788,205 B2
(45) Date of Patent: Jul. 22, 2014

(54) SENSOR DATA COLLECTION

(71) Applicant: Microsoft Corporation, Redmond, WA (US)

(72) Inventors: Jyh-Han Lin, Mercer Island, WA (US);
Chih-Wei Wang, Redmond, WA (US);
Steve DiAcetis, Duvall, WA (US)

(73) Assignee: Microsoft Corporation

( * ) Notice: Subject to any disclaimer, the term of this patent is extended or adjusted under 35 U.S.C. 154(b) by 0 days.

(21) Appl. No.: 13/716,236

(22) Filed: Dec. 17, 2012

(65) Prior Publication Data

US 2014/0172297 A1    Jun. 19, 2014

(51) Int. Cl.
*G01C 21/34* (2006.01)
*G05D 1/00* (2006.01)
*G01C 21/12* (2006.01)
*H04B 1/06* (2006.01)

(52) U.S. Cl.
USPC ............ 701/533; 701/1; 701/409; 455/355

(58) Field of Classification Search
USPC .................. 701/1, 409–460, 533; 455/355
See application file for complete search history.

(56) References Cited

U.S. PATENT DOCUMENTS

| | | | | |
|---|---|---|---|---|
| 8,581,698 B2 * | 11/2013 | Ledlie et al. | .................. | 340/8.1 |
| 2007/0063875 A1 * | 3/2007 | Hoffberg | .................. | 340/995.1 |
| 2010/0324813 A1 | 12/2010 | Sundararajan et al. | | |
| 2011/0090123 A1 * | 4/2011 | Sridhara et al. | ............... | 342/450 |
| 2011/0090124 A1 | 4/2011 | Liu et al. | | |
| 2011/0121963 A1 * | 5/2011 | Prehofer | .................. | 340/539.13 |
| 2011/0191052 A1 | 8/2011 | Lin et al. | | |
| 2012/0029817 A1 * | 2/2012 | Khorashadi et al. | .......... | 701/451 |
| 2012/0143495 A1 * | 6/2012 | Dantu | ............... | 701/428 |
| 2012/0249372 A1 * | 10/2012 | Jovicic et al. | ................. | 342/451 |
| 2012/0270573 A1 | 10/2012 | Marti et al. | | |
| 2013/0166387 A1 * | 6/2013 | Hoffberg | ................. | 705/14.63 |
| 2013/0226451 A1 * | 8/2013 | O'Neill et al. | ................ | 701/450 |

OTHER PUBLICATIONS

Jones, K. Indoor Signal Position Conveyance', Retrieved at <<http://tools.ietf.org/pdf/draft-jones-geopriv-sigpos-survey-01.pdf>>, Nov. 5, 2012, pp. 62.

(Continued)

*Primary Examiner* — Thomas Black
*Assistant Examiner* — Tyler Paige
(74) *Attorney, Agent, or Firm* — Bryan Webster; Andrew Sanders; Micky Minhas

(57) ABSTRACT

Example apparatus and methods concern rigorous survey-plan based sensor data collection where physical survey locations are correlated to logical locations rather than being tightly coupled to physical map locations. An embodiment includes accessing a venue map and a survey plan associated with the venue map. A survey plan includes a survey path defined by one or more logical survey points. A logical survey point includes a unique co-ordinate free identifier, a description of a recognizable location in the venue, and a co-ordinate configured to register the logical survey point to the corresponding venue map. A surveyor surveys the venue using the survey plan. Surveying the venue includes following the survey plan and acquiring sensor fingerprints at sensor reading points along the survey path. A fingerprint observation data store is populated with survey points that are registered to the survey plan. Survey points include sensor fingerprint data and correlation data.

17 Claims, 8 Drawing Sheets

(56) References Cited

OTHER PUBLICATIONS

Li, et al., A Reliable and Accurate Indoor Localization Method Using Phone Inertial Sensors', Retrieved at <<http://research.microsoft.com/en-us/um/people/zhao/pubs/ubicomp12_IndoorNav.pdf>>, In the proceedings of the 2012 ACM Conference on Ubiquitous Computing, Sep. 5, 2012, pp. 10.

Briley, "Google Launches App for Indoor Venue Mapping", Retrieved at <<http://www.thetechlabs.com/tech-news/google-indoor-venue-mapping-app/>>, Retrieved Date: Nov. 19, 2012, pp. 4.

"Explore the great indoors with Google Maps for Android in France", Retrieved at <<http://google-latlong.blogspot.in/2012/09/xplore-great-indoors-with-google-maps.html>>, Sep. 25, 2012, pp. 2.

"Crowd Sourcing Based on Dead Reckoning", U.S. Appl. No. 13/183,124, filed Date: Jul. 14, 2011, pp. 48.

\* cited by examiner

SENSOR DATA COLLECTION

BACKGROUND

People like having maps so that they know where they are and so they can figure out how to get from where they are to somewhere else. People also like their mobile devices (e.g., cellular telephones). One use for mobile devices is to provide maps, location services, direction services, and other positioning services. Conventionally, positioning services for mobile devices have been supported by a global positioning system (GPS). GPS works well outdoors and when sufficient satellites are in the line of sight of the device. However, conventional GPS based positioning or map services may not function when line of sight to a sufficient number of satellites is not available. Losing line of sight to a sufficient number or type of satellites may lead to the presence of GPS "dead zones" in locations like inside buildings, under bridges, underground, and during GPS blackouts. Even though a person or machine is in a GPS dead zone (e.g., area where GPS does not provide satisfactory performance), the person may still want to have an accurate position on a map and the ability to receive directions. For example, people may like to have maps and positioning services available on their mobile devices while inside a shopping mall, while inside a convention center, while inside a casino, while inside an office building, while down in a sewer network, or while in other locations that may experience a GPS dead zone.

Since users of personal devices spend time in GPS dead zones, attention has already been paid to location services that will function on personal devices even when "indoors" (e.g., in a GPS dead zone). These location services have typically relied on performing trilateration, triangulation, dead reckoning, or other positioning approaches based on other information that may be available. The other information has included radio frequency (RF) signals (e.g., Wi-Fi signals, cellular telephone signals), information from accelerometers, information from barometers, and information from other sensors. These conventional location services have typically relied on a coupling between physical co-ordinates on an indoor map and a set of sensor data acquired over time from devices that have passed through the area covered by the indoor map.

Approaches for collecting sensor data from which indoor maps can be created have included crowd-sourced approaches, ad hoc approaches, planned approaches, grid-by-grid approaches, and other approaches. However, these conventional approaches appear to tightly couple the acquisition of sensor-based location information to physical co-ordinates (e.g., latitude/longitude, x/y/z) on pre-defined maps. The maps of the physical realities of our geography are constantly changing. Thus, sensor readings that are tightly coupled to physical co-ordinate based maps may become obsolete as the maps of the physical realities change.

One challenge for indoor positioning systems involves collecting sensor data and accurate positions that describe where the sensor data was acquired. Ideally, a surveyor would position themselves at a series of known, fixed points described by a physical co-ordinate (e.g., latitude/longitude) and acquire sensor data at those points. However, since the locations being surveyed are part of a GPS dead zone, GPS is likely unavailable to facilitate positioning the surveyor in the precise survey points required in the tightly coupled physical co-ordinate approach.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods access a venue map and a survey plan associated with the venue map, where the survey plan uses logical survey points that facilitate decoupling the survey plan from the tightly coupled physical co-ordinate approach. The survey plan may include a survey path defined by one or more logical survey points. A logical survey point may include a unique co-ordinate free identifier that facilitates the decoupling. The identifier may persist through future revisions of a venue map. A logical survey point may also include a description of a recognizable location in the venue and a co-ordinate configured to register the logical survey point to the venue map. Example apparatus and methods provide the survey plan to a surveyor (e.g., human, robot) and then receive sensor fingerprints from various sensor reading points along the survey path. The sensor fingerprint may be processed in view of the logical survey point to produce a sensor reading point data structure that is then registered to the venue map. Multiple registered sensor reading point data structures may be stored in a fingerprint observation data store. In one embodiment, a fingerprint may include GPS-style or latitude/longitude co-ordinates. When the fingerprint includes GPS-style or latitude/longitude co-ordinates, example apparatus and methods may selectively choose to ignore this information.

Example apparatus and methods may be configured to perform sensor data collection as controlled by a decoupled survey plan associated with an area located in a GPS dead zone or even in an area for which GPS signals may be available. The decoupled survey plan may include a point for which there is a co-ordinate based ground truth available. The point may be described with reference to a visual landmark and without reference to the co-ordinate based ground truth. Example apparatus and methods may produce a radio frequency sensor based survey for the area associated with the global positioning system dead zone based, at least in part, on the decoupled survey plan and on sensor readings acquired during one or more surveys. Example apparatus and methods may register the radio frequency sensor based survey to a map representing the area associated with the global positioning dead zone.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
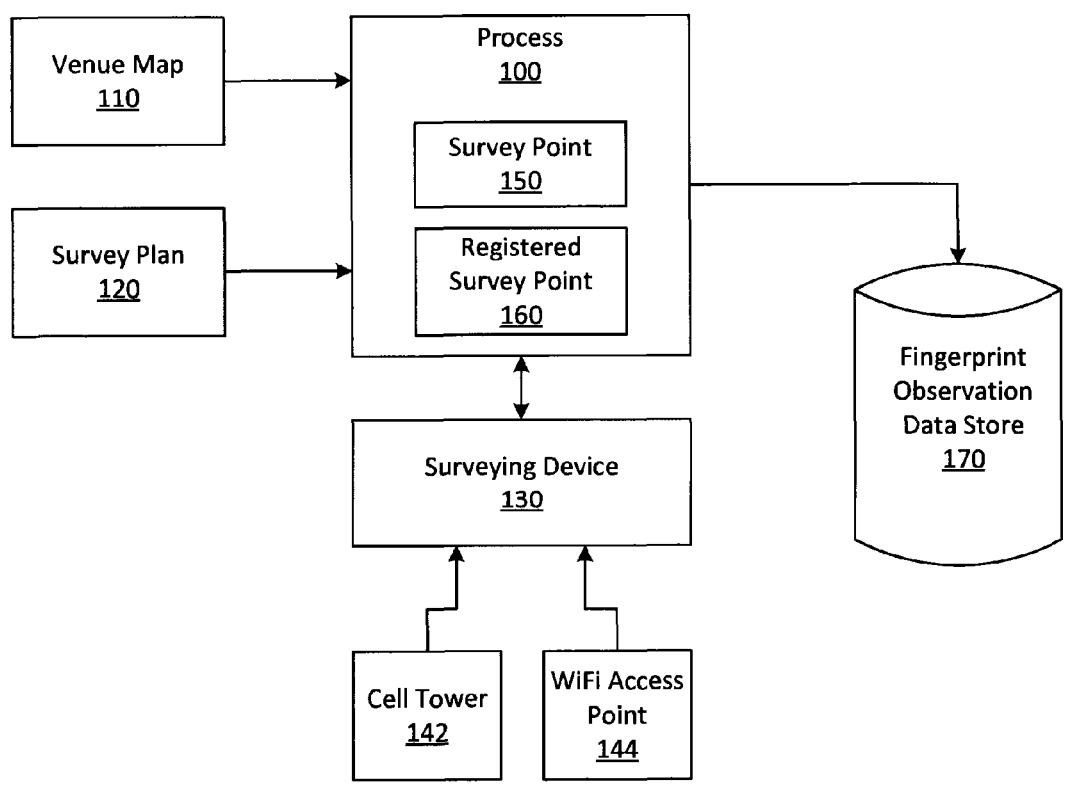
FIG. 1 illustrates an example data flow associated with sensor data collection.

People like having maps so that they know where they are, so that they know where they've been, so they'll know how to get from where they are to where they want to be, and for other reasons. For example, when in a mall, a shopper may like to know how to get from one store to another store. Similarly, in a large office building, a mail room person may like to know how to get to a particular worker's desk to be able to deliver the mail. Likewise, in a warren of underground sewer pipes, a worker may want to know how to get to a particular clean out valve. Unfortunately, maps about locations change. For example, there may be two, three, or a dozen revisions of a map for a venue.

Additionally, the physical configuration of a mall, of an office building, or of a network of underground pipes can change. More generally, the physical reality of a physical geography can change or the mapping of a location can change. These changes may happen so rapidly that maps quickly become obsolete or inaccurate. For example, the aisles and booths in a convention center can be changed from event to event. Similarly, the locations of various stores and kiosks in a mall can change. Likewise, the location, size, number, and orientation of cubicles in an office can change. Thus, maps can and do get out-of-date. There are additional sources of change. Even if the physical reality of a location remains the same, a map of that location may change due to factors including, but not limited to, corrections, and scaling.

Conventional indoor maps for mobile devices have relied on mappings between sensor readings and physical locations (e.g., map locations) on corresponding indoor maps. However, maps for a venue may change from time to time, creating multiple versions of maps for a venue. Additionally, if the physical reality changes, the mapping between sensor readings and physical locations may become out-of-date or obsolete. Even if a user has an accurate GPS fix or an accurate non-GPS fix, that fix is substantially worthless without a binding to an up-to-date map.

Example apparatus and methods anticipate multiple versions of maps, changing maps, and changing physical realities and are configured to facilitate selectively re-binding sensor data acquired for one version of a venue map for use with another version of a venue map. The re-binding is possible, at least in part, because of how the sensor data is acquired in the first place. Example apparatus and methods acquire sensor readings that are relative to logical survey points that may be related to different venue maps rather than being relative to physical co-ordinates on a single fixed map. The sensor readings are bound indirectly to physical locations through an intermediary logical location (e.g., survey point) rather than being bound directly to physical locations. While a binding between a physical location (e.g., map location) and a logical location is made for a particular map of a physical reality as reflected in a particular version of a venue map, the binding can be manipulated over time to accommodate changing physical realities so that the binding will be consistent with the most recent map version. The particular mapping of a physical reality may be represented by one version or instance of a venue map. Thus, an accurate fix may be related to a current map through the relationship between a logical survey point and the current map.

A survey point is immutable, both logically and in physical reality. Example apparatus and methods are configured to handle changes in the mapping of the logical to the pseudo physical reality in different map versions. Consider a survey point described as being a turn around the coffee shop in the mall. A first version of a map (e.g., map1) may map the survey point to {venue name, floor, latitude1, longitude1}. This is pseudo reality version 1. A second version of a map (e.g., map2) may map the survey point to {venue name, floor, latitude2, longitude2). This is pseudo reality version 2. The precise position of the survey point has not been mentioned. Even though the physical realities behind both map versions are the same, the mapping is subject to map accuracy, scaling, and other differences that may exist between the two versions of the map. If the coffee shop actually changed their location so that the survey point became inaccessible, then a new survey point could be created to represent a new turn location.

Example apparatus and methods associate survey plans with a venue map. In one embodiment, the survey plan may be part of the metadata for a venue map. The survey plan becomes the basis for indoor data collection by a surveyor. A survey plan includes at least one survey path. A survey path can be defined by a starting survey point and an ending survey point. A survey path may also be described by a starting point and a direction of travel. A survey path may also be described in a way that makes it likely that the surveyor will travel along a logical survey path without having to necessarily start at a logical survey point. A survey point is a recognizable location that can be used as a landmark.

Logical survey points may be human recognizable, recognizable by an apparatus, recognizable by a process, or recognizable in other ways that do not depend on co-ordinates. For example, a survey point may be described as being near the front door of a certain store while facing the front door of a second store. A logical survey point has a unique identifier that does not depend on a position described by a co-ordinate system. A logical survey point includes information that describes a recognizable location in the venue associated with the venue map. A logical survey point stores co-ordinate information sufficient for registering the recognizable location with a position on the venue map. As a surveyor moves from logical survey point to logical survey point, the surveyor collects sensor information at a number of sensor reading points. The logical survey points are pre-defined, the sensor reading points are not. The sensor reading points are places where a sensor records sensor information. Sensor readings may be taken on each step of the surveyor, at regular time intervals, and under other controls. The sensor information provides a signature or fingerprint for a location. Conventional systems bind the fingerprints to physical locations on a map using a co-ordinate system. Example apparatus and methods take a more flexible indirect approach of relating the fingerprint to a logical location. An underlying co-ordinate for a fingerprint location may later be generated using a co-ordinate established for the logical location. The logical location may be bound to different maps and thus the fingerprint may also be used in different maps.

In one embodiment, a logical survey point may be established at a human recognizable location like a corner or turn that can be used as a landmark during a walking survey of an indoor venue. Conventional systems may also have used survey points. However the conventional survey points were identified by their physical attributes (e.g., latitude/longitude) rather than by their logical attributes (e.g., center of the first aisle, front of a store). Unfortunately, different versions of maps for a location can change or be different. For example, an aisle in a convention center may be rendered in one location on a first version of a map but may be rendered in a second location on a second version of the map. Additionally, the physical co-ordinates of a logical survey point can change from one version of a venue map to another version of a venue map as the physical reality changes. For example, the first aisle in a convention center may be ten feet from the north wall of a convention center for a first event but may be twenty five feet from the north wall of the convention center for a second event. However, for both events, a survey plan could direct a surveyor to start "in the center of the first aisle." The "center of the first aisle" could be bound to different actual physical co-ordinates for the two versions of the venue map.

Example apparatus and methods rely on logical survey points instead of fixed physical survey points. A logical survey point may be identified using something other than a co-ordinate system. For example, a logical survey point may have a name and a unique identifier (e.g., globally unique identifier (GUID)). The unique identifier may be a persistent identifier. For a particular instance of a venue, a logical survey point may be associated with certain physical co-ordinates. However the physical co-ordinates are provisional. As the map changes from version to version, or as the geography of a venue changes (e.g., wall relocated, walkway relocated, fountain added, fountain removed), the physical co-ordinates of a logical co-ordinate may change. The persistent identifier for the logical survey point may not change from version to version of the venue map. Note that if the physical layout changes, some new survey points may be required as old survey points may become unreachable.

A rigorous survey plan for decoupled sensor data collection relies on moving from logical survey point to logical survey point and acquiring fingerprints at positions between the logical survey points. Rather than telling a surveyor to start at a specific latitude/longitude co-ordinate, example systems and methods tell a surveyor to start at the co-ordinates associated with a logical location (e.g., front of store). This decouples the initial positioning from any particular instance of a map. Although decoupled, the physical co-ordinates of the logical location can be bound to a particular instance of the venue map. Given a map version, a survey point in a given survey plan may be assigned physical co-ordinates for that map version.

FIG. 1 illustrates an example data flow associated with sensor data collection. A process 100 may access a venue map 110 and a survey plan 120. In one embodiment, the survey plan 120 may be embedded in metadata associated with venue map 110. The process 100 may provide information describing a survey path to a surveying device 130 that will move along the survey path. The surveying device 130 may acquire information at a series of locations from different devices (e.g., cell tower 142, Wi-Fi Access Point 144). This information may be used to produce sensor fingerprints that are provided to the process 100. Process 100 may compute a survey point 150 and a registered survey point 160 using the sensor fingerprint. Information concerning sensor information registered to locations on a venue map may be selectively written to a fingerprint observation data store 170.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
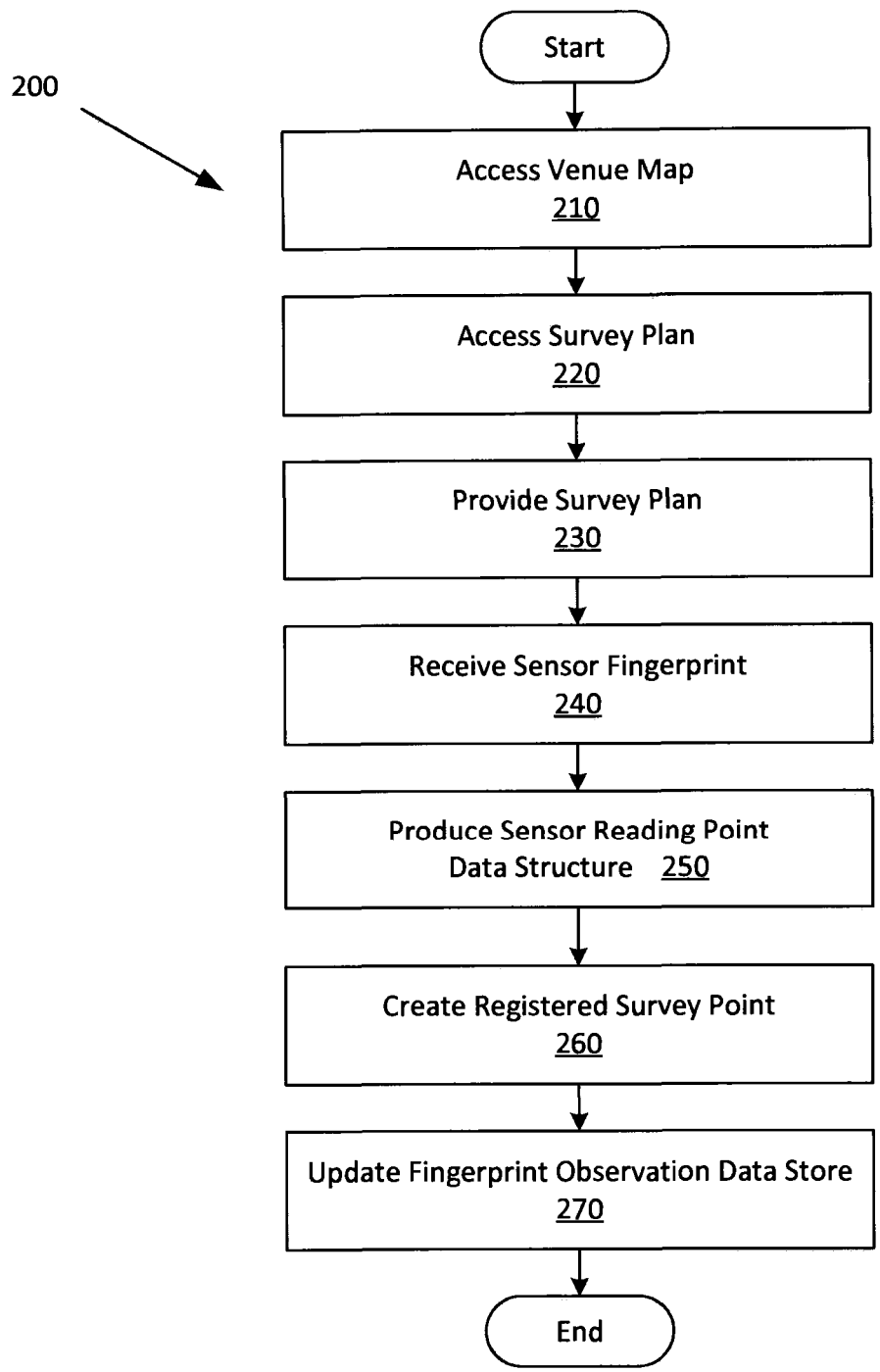
FIG. 2 illustrates an example method associated with sensor data collection.

FIG. 2 illustrates an example method 200 associated with collecting sensor data. In different examples, method 200 may be performed on a single device, may be performed partially or completely in the cloud, may be performed on distributed co-operating devices, or may be performed other ways. In different examples, method 200 may be performed on devices including, but not limited to, a computer, a laptop computer, a tablet computer, a phone, and a smart phone.

Method 200 accesses different data sets. In different examples, the data sets may be stored as separate data sets on separate devices, may be stored as separate data sets on a single device, may be stored as a single data set on a single device, and may be stored in other ways. In one embodiment, a device may access data sets stored in one location (e.g., cloud) when the device has network connectivity but may access data sets in another location (e.g., local memory) when the device does not have network connectivity. Online data may be more up-to-date than locally stored data, but locally stored data may be employed based on connectivity criteria or other criteria.

Method 200 includes, at 210, accessing a venue map. In different embodiments, accessing the venue map may include actions including, but not limited to, receiving the venue map, receiving a link to the venue map, binding to the venue map, interacting with a computer file that stores a portion of the venue map, interacting with a computer memory that stores a portion of the venue map, communicating with a local data store that stores a portion of the venue map, communicating with a remote data store that stores a portion of the venue map, and communicating with a cloud-based data store that stores a portion of the venue map.

The venue map may be described by a venue map data set. The venue map data set may store information including, but not limited to, a name of the venue, a name of the venue map, an identifier of the venue, an identifier of the venue map, a location of the venue, a space represented by the venue map, an element in the space, and a symbolic depiction of relationships between elements in the space.

Method 200 also includes, at 220, accessing a survey plan associated with the venue map. In one embodiment, the survey plan may be embedded in metadata associated with the venue map. Thus, in one embodiment, a preliminary action may include embedding the survey plan in metadata associated with the venue map. In different embodiments, accessing the survey plan may include actions including, but not limited to, receiving the survey plan, receiving a link to the survey plan, binding to the survey plan, interacting with a computer file that stores a portion of the survey plan, interacting with a computer memory that stores a portion of the survey plan, communicating with a local data store that stores a portion of the survey plan, communicating with a local data store that stores a portion of the survey plan, and communicating with a cloud-based data store that stores a portion of the survey plan.

The survey plan may be described by a survey plan data set. The survey plan data set may store information including, but not limited to, a name of the survey plan, an identifier of the survey plan, and a venue map to which the survey plan applies.

The survey plan includes information about a survey path. In one embodiment, a survey path may be defined by a starting logical survey point and an ending logical survey point. In another embodiment, a survey path may be defined by a starting logical survey point and a direction to travel. In another embodiment, a survey path may be defined using directions that make it likely that a logical survey point will be traversed without requiring either starting or stopping at a logical survey point. Other definitions of survey paths may be employed. In one embodiment, a logical survey point includes a unique co-ordinate free identifier, a description of a recognizable location in the venue, and a co-ordinate configured to register the logical survey point to the venue map. The co-ordinate free identifier may be, for example, a persistent globally unique identifier (GUID). Other identifiers may be employed. The description of the recognizable location may take different forms. In different examples the description of the recognizable location may include a textual description of the recognizable location, a visual description of the recognizable location, or a sensor-based description of the recognizable location. By way of illustration, a logical survey point may include a description that reads "position yourself just to the right of the front door of Store1 while facing the clown in front of Restaurant1."

Method 200 also includes, at 230, providing the survey plan to a surveyor. The survey may be performed by different types of surveyors. In different examples, the surveyor may be a human surveyor, an automated surveyor, or a robotic surveyor. Thus, providing the survey plan may include producing a visual display, generating a voice instruction, or generating a machine instruction. Different types of surveyors may be provided with different types of instructions for performing the survey plan. In one embodiment, the surveyor may be a volunteer who is visiting a mall and who decides to participate in crowd-sourcing of the indoor map. Mall walkers who exercise in the mall on a regular basis may provide this volunteer service. The volunteer may position themselves at a logical starting point and follow the survey plan. This surveyor may receive visual, written, or audible instructions. In another embodiment, a robot may be programmed to travel the survey path. In this embodiment, the robot may include an apparatus (e.g., computer, cell phone) that acquires the venue map and the survey plan and then follows survey paths found in the survey plan. In different embodiments, the robot may be controlled to survey continuously, to survey at pre-determined times, to survey upon detecting a change in a condition, or to survey as controlled by a manager of the robot.

Method 200 also includes, at 240, receiving a sensor fingerprint at a sensor reading point along the survey path. In different embodiments, receiving a sensor fingerprint may include receiving signals from devices including, but not limited to, a Wi-Fi device, a cellular telephone device, an accelerometer, a barometer, a compass, a gyroscope, a Bluetooth device, an infrared device, and a device that produces a radio frequency signal. Not just the signal, but also information about the signal may be acquired or stored. For example, information may be acquired and stored that includes, but is not limited to, an identifier of a signal in the sensor fingerprint, a strength associated with a signal in the sensor fingerprint, a direction associated with a signal in the sensor fingerprint, and a timestamp associated with a signal in the sensor fingerprint.

Method 200 also includes, at 250, producing a sensor reading point data structure based, at least in part, on the sensor fingerprint and the logical survey point. Producing the sensor reading point data structure may include populating a data store with the sensor fingerprint and the information describing the signal(s) associated with the sensor fingerprint. In one embodiment, a user may identify (e.g., register) that they have just passed a logical survey point by taking an action (e.g., tapping their phone, pressing a button on survey device).

Method 200 also includes, at 260, creating a registered survey point by registering the sensor reading point data structure with the venue map. A registered survey point corresponds to a sensor reading point. In one embodiment, creating the registered survey point includes establishing a relationship between the sensor fingerprint and the sensor reading point. Establishing the relationship between the sensor fingerprint and the sensor reading point may include populating a survey point data store with the sensor fingerprint, with information describing the sensor reading point, and with information that correlates the sensor reading point to the sensor fingerprint. Information that correlates the sensor reading point and the sensor fingerprint may include, for example, a timestamp, a step count, a sensor identifier, and other information. Creating the registered survey point may also include establishing a relationship between the sensor reading point and the survey plan. Establishing the relationship between the sensor reading point and the survey plan may include populating the survey point data store with information describing the sensor reading point, with information describing the survey plan, and with information that correlates the sensor reading point to the survey plan. Information that correlates the sensor reading point to the survey plan may include, for example, a survey plan identifier, a time stamp, and other information.

Method 200 also includes, at 270, updating a fingerprint observation data store with the registered survey point. Updating a fingerprint observation data store may include writing data to a file, writing data to a memory, transmitting data to a local apparatus, transmitting data to a remote apparatus, providing data to a local process, providing data to a remote process, sending data to a cloud service, and other actions.

Figure 3:
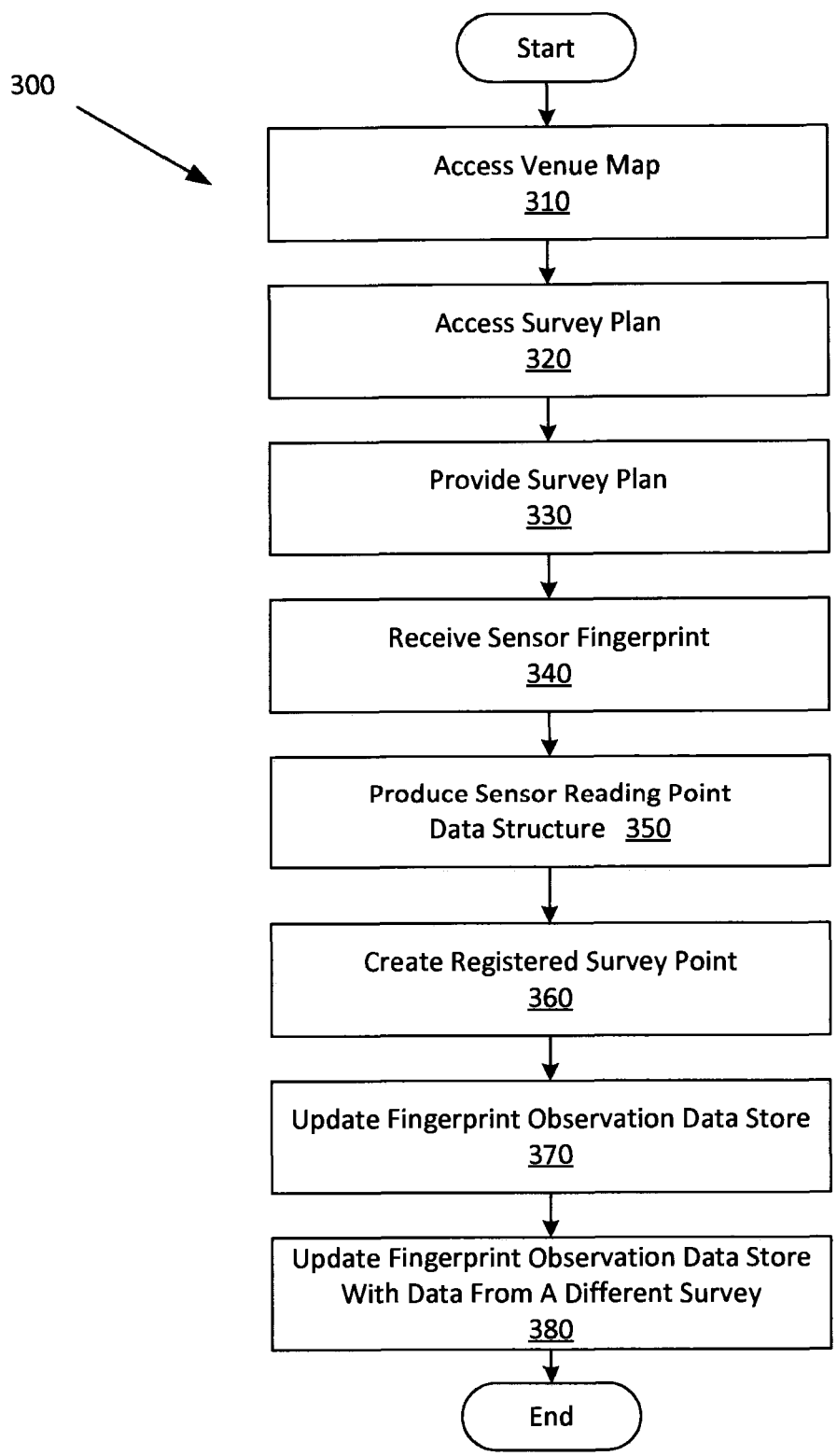
FIG. 3 illustrates an example method associated with sensor data collection.

FIG. 3 illustrates an example method 300 associated with sensor data collection. Method 300 includes some actions similar to actions in method 200. For example, method 300 includes accessing data sets at 310 and 320, providing a survey plan at 330, receiving a sensor fingerprint at 340, producing a sensor reading point data structure at 350, creating a registered survey point at 360, and updating a fingerprint observation data store at 370. However, method 300 also includes an additional action. Method 300 also includes, at 380, updating the fingerprint observation data store with a registered survey point produced at a second, different time as part of a second, different survey that may have used a different (e.g., earlier) version of a venue map. Recall that maps may change and that devices whose signals intersect with the space represented by a map may change. Thus, a venue may be surveyed more than one time. Some venues may be surveyed frequently, particularly when crowd-source surveys are employed. Additionally, different surveying equipment may record different sensor fingerprints at different times. Therefore it is likely that a venue may be surveyed multiple times and that the surveys may include different sensor fingerprints associated with different sensor reading points. Method 300 reflects that the fingerprint observation data store may be updated with information acquired during different surveys. Since the survey plan is decoupled from any particular venue map but can be bound to different venue maps, the data acquired using the logical survey point based survey plan based approach can be maintained and recycled for different versions of a venue map. It may be difficult, if even possible at all, for conventional systems that rely on surveys that are bound to co-ordinate based physical plans to recycle, reuse, or maintain data in this way.

While FIGS. 2 and 3 illustrates various actions occurring in serial, it is to be appreciated that various actions illustrated in FIGS. 2 and 3 could occur substantially in parallel. By way of illustration, a first process could access data sets, a second process could handle creating and providing survey plans, a third process could acquire sensor data and produce registered survey points, and a fourth process could manage a fingerprint observation data store. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 200 or 300. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 4:
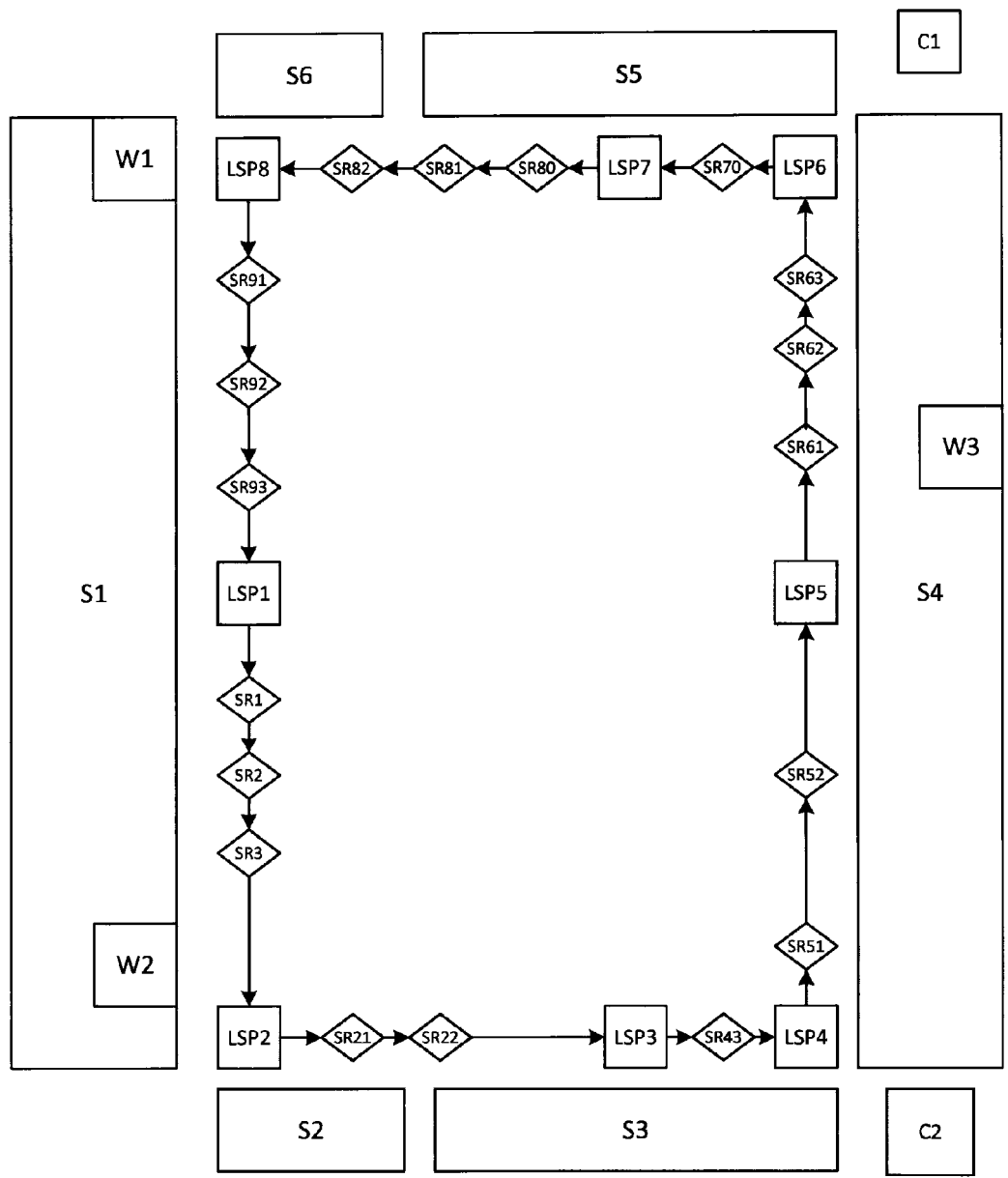
FIG. 4 illustrates an example survey path for a venue.

FIG. 4 illustrates an example apparatus survey plan associated with a venue map. A venue map may include representations of several stores (e.g., S1, S2, S3, S4, S5, and S6). The survey plan may identify several logical survey points (LSP) (e.g., LSP1, LSP2, LSP3, LSP4, LSP5, LSP6, LSP7, and LSP8). A surveyor may be provided with instructions that facilitate moving from LSP to LSP in order. As the surveyor travels a path from LSP to LSP, sensor readings may be acquired. For example, a sensor reading (SR) may be acquired at points SR1, SR2, SR3 . . . SR21, SR22, . . . SR42, . . . SR51, SR52, . . . SR61, SR62, SR63, . . . SR70, SR71 . . . SR80, SR81, SR82, . . . SR91, SR92, SR93 . . . ). While the LSPs are pre-defined, the precise locations of the SRs may not be pre-planned. The SRs are the places where sensor readings are taken. Sensor readings may be acquired at some sampling rate. As a surveyor passes a logical survey point, an optional action (e.g., tap, button press, shake) may be undertaken to register the surveyor to the LSP. The sensor readings may be taken after a certain step count has been detected, after a certain time interval has passed, and at other times. The sensor readings may be retrieved from, for example, Wi-Fi access points W1, W2, W3 or from cellular devices C1 and C2. A ground truth (e.g., precise latitude/longitude) may or may not be available for a logical survey point. When a ground truth is available, the venue map can be bound to the survey plan using the ground truth associated with the logical survey point.

Figure 5:
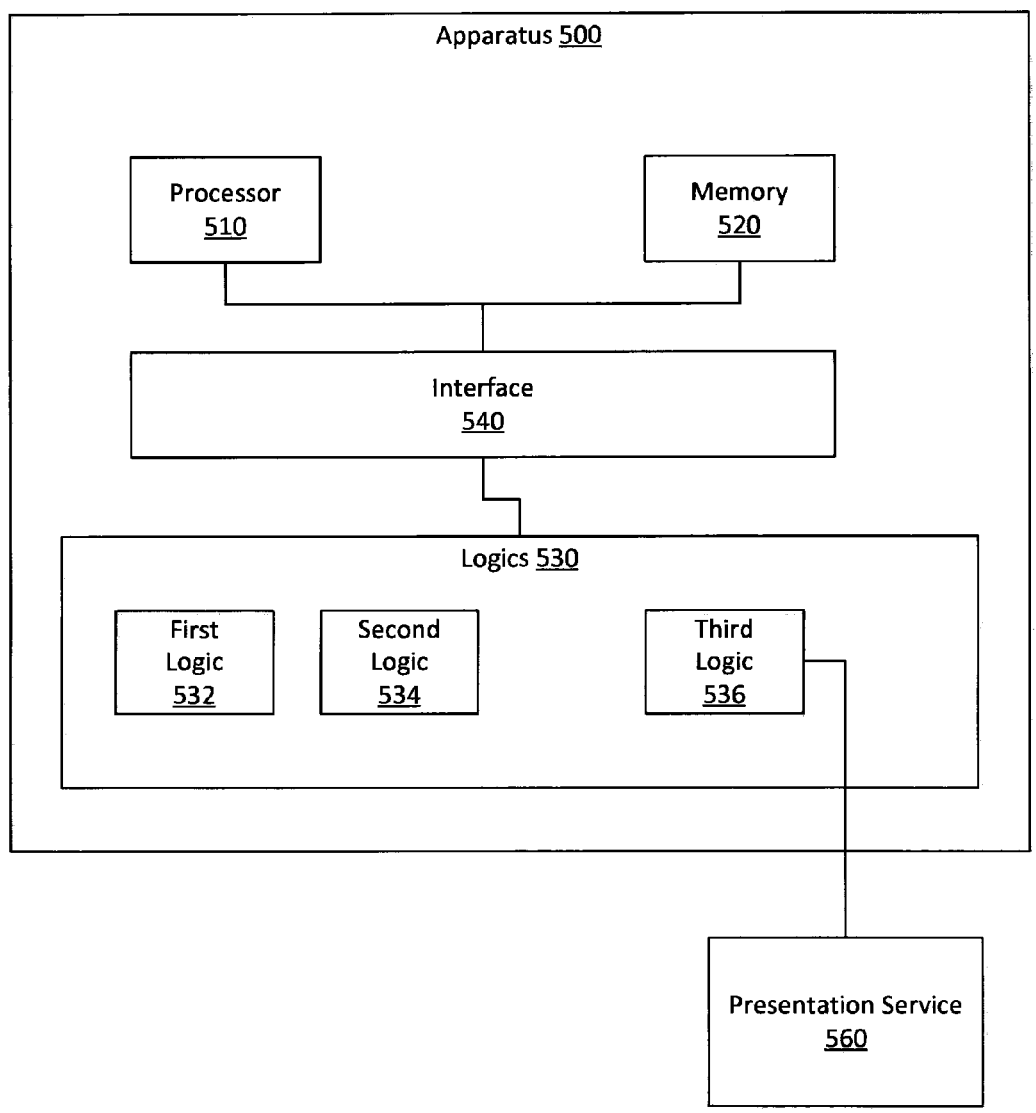
FIG. 5 illustrates an example apparatus configured to perform sensor data collection.

FIG. 5 illustrates an apparatus 500 that includes a processor 510, a memory 520, a set 530 of logics, and an interface 540 that connects the processor 510, the memory 520, and the set 530 of logics. The set 530 of logics may be configured to perform sensor data collection as controlled by a decoupled survey plan. Apparatus 500 may be, for example, a computer, a laptop computer, a tablet computer, a personal electronic device, a smart phone, or other device that can access and process data.

In one embodiment, the apparatus 500 may be a general purpose computer that has been transformed into a special purpose computer through the inclusion of the set 530 of logics. The set 530 of logics may be configured to perform survey plan based sensor data collection. Apparatus 500 may interact with other apparatus, processes, and services through, for example, a computer network.

The set 530 of logics may include a first logic 532 that is configured to access the decoupled survey plan for surveying an area located in a global positioning system dead zone. In one embodiment, the decoupled survey plan begins at a point for which there is a co-ordinate based ground truth available. In another embodiment, the decoupled path passes through a point for which there is a co-ordinate based ground truth. Although there is a ground truth (e.g., precise latitude/longitude) available for the point, the point may not be persistently referred to using the co-ordinate based information. Instead, the point may be described to a surveyor with reference to a visual landmark without reference to the co-ordinate based ground truth.

In one embodiment, the first logic 532 is configured to provide information concerning the decoupled survey plan as one of, a visual display on the apparatus 500, an audible transmission from the apparatus 500, and as instructions for directing the apparatus 500. In different embodiments, or at different times, depending on different conditions, the map data may be acquired in different ways. For example, map data may be acquired from a local data store if there is no connectivity or if a preference has been configured to acquire information locally. If connectivity permits, map data may be acquired from a remote data store.

The set 530 of logics may also include a second logic 534 that is configured to produce a radio frequency sensor based survey for the area located in the global positioning system dead zone based, at least in part, on the decoupled survey plan. In one embodiment, the second logic 534 may be configured to produce the radio frequency sensor based survey by acquiring a series of sensor readings at a series of points along the decoupled survey plan. The sensor readings may include information from which a relative distance to the point for which there is a ground truth can be computed for members of the series of points.

The set 530 of logics may also include a third logic 536 that is configured to register the radio frequency sensor based survey to a map representing items located in the global positioning dead zone. In one embodiment, the third logic 536 may be configured to register the RF sensor based survey to a map representing items located in the GPS dead zone as a function of a relationship between the point for which there is a ground truth, members of the series of points, and a point on the map. In one embodiment, the third logic 536 may be configured to register the RF sensor based survey to a second, different map that represents items located in the GPS dead zone as a function of a relationship between the point for which there is a ground truth, members of the series of points, and a point on the second, different map.

In different embodiments, some processing may be performed on the apparatus 500 and some processing may be performed by an external service or apparatus. Thus, in one embodiment, apparatus 500 may also include a communication circuit that is configured to communicate with an external source to facilitate receiving or transmitting items including, but not limited to, map data, survey data, and sensor data. In one embodiment, the third logic 536 may interact with a presentation service 560 to facilitate displaying data using different presentations for different devices.

Figure 6:
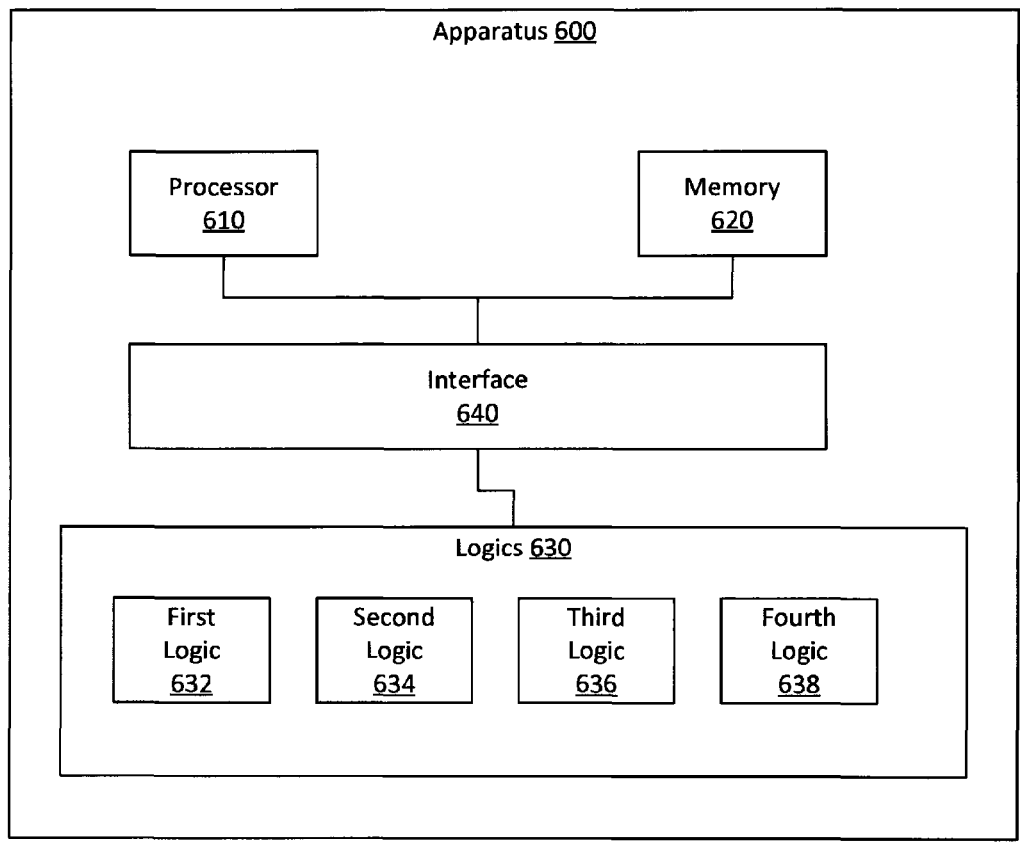
FIG. 6 illustrates an example apparatus configured to perform sensor data collection.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. The fourth logic 638 may be configured to selectively update the radio frequency sensor based survey using sensor data acquired during different survey plan based sensor collections of data taken from the GPS dead zone. The different data collections may be performed at different times as part of different surveys. For example, a first surveyor may walk the mall at eight a.m. travelling clockwise around the survey path. A second surveyor may walk the mall at noon travelling counter-clockwise around the survey path. Fourth logic 638 facilitates integrating sensor data from both collections into a single fingerprint observation.

Figure 7:
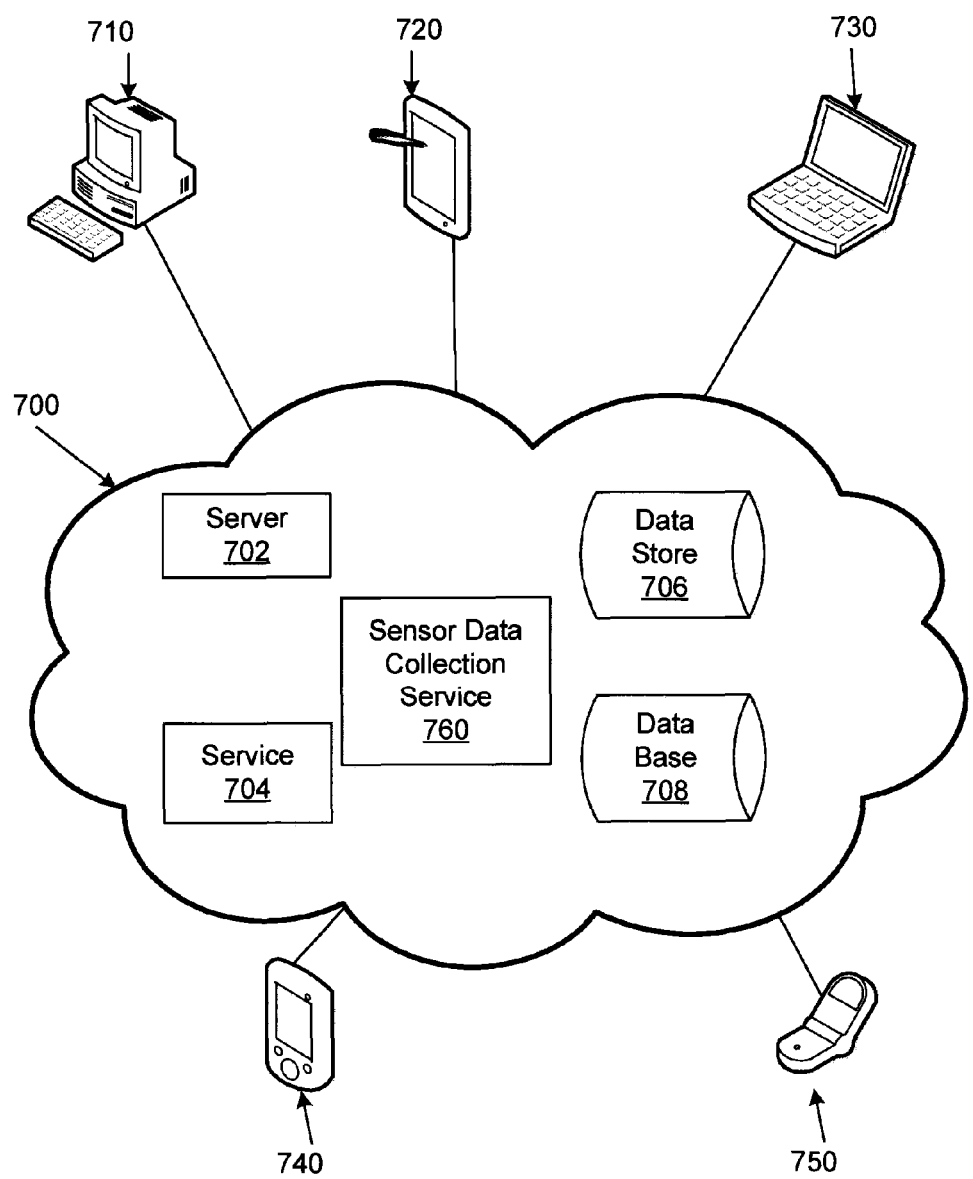
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example sensor data collection service 760 residing in the cloud. The sensor data collection service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the sensor data collection service 760.

FIG. 7 illustrates various devices accessing the sensor data collection service 760 in the cloud. The devices include a computer 710, a tablet 720, a laptop computer 730, a personal digital assistant 740, and a mobile device (e.g., cellular phone, satellite phone) 750. The sensor data collection service 760 may produce a fingerprint observation. The fingerprint observation may include data that can be bound to different venue maps through different survey plans. The venue maps can be correlated to the survey plans through physical co-ordinates associated with a logical survey point.

It is possible that different users at different locations using different devices may access the sensor data collection service 760 through different networks or interfaces. In one example, the sensor data collection service 760 may be accessed by a mobile device 750. In another example, portions of sensor data collection service 760 may reside on a mobile device 750.

Figure 8:
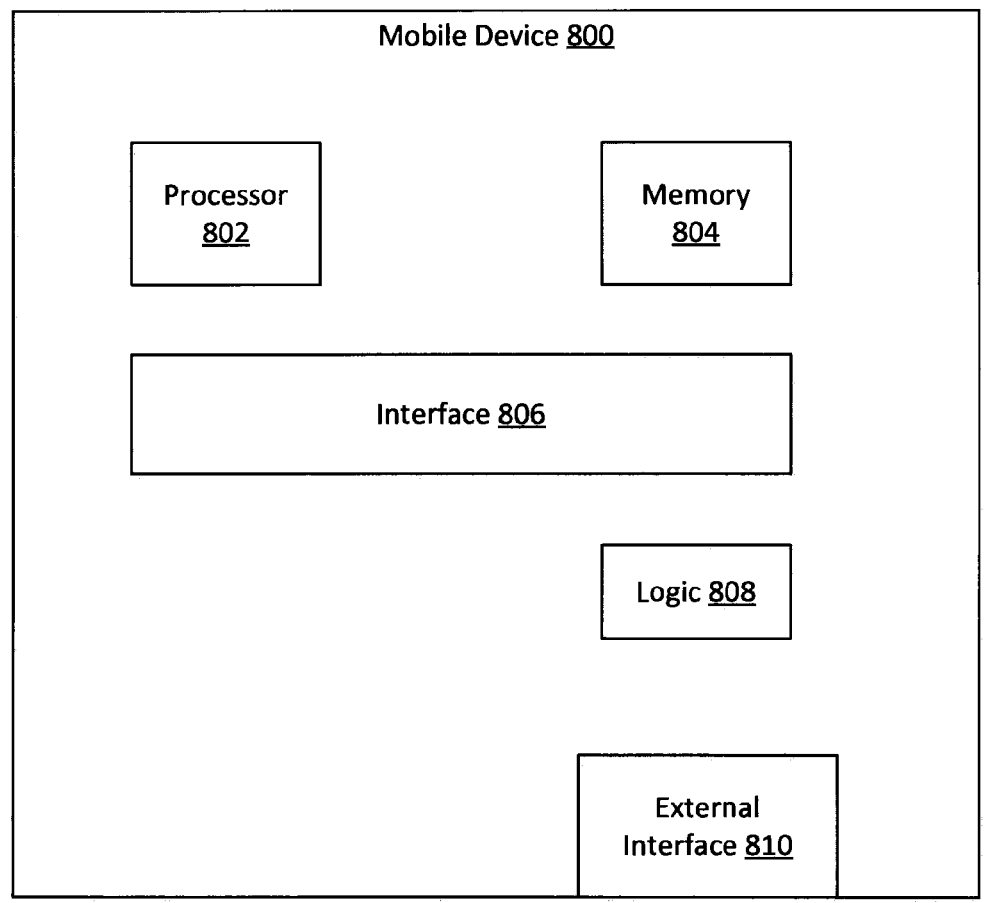
FIG. 8 illustrates an example mobile computing device configured to perform sensor data collection.

FIG. 8 illustrates an example mobile device 800. Mobile device 800 may be carried by a user doing sensor data collection as part of a survey. Multiple users may carry multiple mobile devices to perform multiple surveys of a venue. Mobile device 800 includes a processor 802, a memory 804, a logic 808, and an external interface 810 that may be connected by an interface 806. Mobile device 800 may be, for example, a cellular telephone, a network telephone, or other device. Generally describing an example configuration of the mobile device 800, the processor 802 may be a variety of various processors including dual microprocessor and other multi-processor architectures. The memory 804 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 804 can store an operating system that controls and allocates resources of the mobile device 800. The memory 804 may also store a sensor data collection process that may be used to control a robot or other machine to automatically collect data as part of an automated survey.

The interface 806 may be a single internal bus interconnect architecture or other bus or mesh architectures. While a single bus is illustrated, it is to be appreciated that the mobile device 800 may communicate with various devices, logics, and peripherals using other busses (e.g., PCIE, 1394, USB, Ethernet). The interface 806 can be types including, for example, a memory bus, a memory controller, a peripheral bus, an external bus, a crossbar switch, or a local bus.

The mobile device 800 can operate in a network environment and thus may be connected to a network through network devices via the external interfaces 810. The mobile device 800 may be logically connected to remote computers through the network and the network devices. Through the network, the mobile device 800 may also be connected to services (e.g., service 760, FIG. 7) provided in the cloud (e.g., cloud 700, FIG. 7). Networks with which the mobile device 800 may interact include, but are not limited to, a local area network (LAN), a wide area network (WAN), a telephony network, a telephony system, a cellular system, a satellite system, and other networks.

Mobile device 800 may include a special purpose logic 808 that is configured to provide a functionality for the mobile device 800. For example, logic 808 may provide a client for interacting with a service (e.g., service 760, FIG. 7), or for performing sensor data collection.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
accessing a venue map associated with a venue;
accessing a survey plan associated with the venue map, where the survey plan includes a survey path defined by a starting logical survey point and an ending logical survey point, where a logical survey point comprises a persistent unique co-ordinate free identifier, a description of a recognizable location in the venue, and a co-ordinate configured to register the logical survey point relative to the venue map;
providing the survey plan to a surveyor;
receiving a sensor fingerprint at a sensor reading point along the survey path;
producing a sensor reading point data structure based, at least in part, on the sensor fingerprint, the sensor reading point, and the starting logical survey point;
creating a registered survey point by registering the sensor reading point data structure with the venue map; and
updating a fingerprint observation data store with the registered survey point.

2. The method of claim 1, where accessing the venue map includes acquiring information concerning one or more of: a name of the venue, a name of the venue map, an identifier of the venue, an identifier of the venue map, a location of the venue, a space represented by the venue map, an element in the space, or a symbolic depiction of relationships between elements in the space.

3. The method of claim 1, where accessing the survey plan includes acquiring information concerning one or more of: a name of the survey plan, an identifier of the survey plan, or a venue map to which the survey plan applies.

4. The method of claim 1, where the description of the recognizable location includes a sensor-based description of the recognizable location.

5. The method of claim 1, where the survey plan is embedded in metadata associated with the venue map.

6. The method of claim 1, comprising embedding the survey plan in metadata associated with the venue map.

7. The method of claim 1, where the surveyor is one of: a human surveyor, an automated surveyor, and a robotic surveyor and where providing the survey plan includes one or more of: producing a visual display, generating a voice instruction, or generating a machine instruction.

8. The method of claim 1, where receiving a sensor fingerprint includes receiving a signal from one or more of: an accelerometer, a barometer, a compass, a gyroscope, or an infrared device.

9. The method of claim 1, where creating the registered survey point comprises establishing a first relationship between the sensor fingerprint and the sensor reading point, and establishing a second relationship between the sensor reading point and the survey plan.

10. The method of claim 9, where establishing the first relationship comprises populating a survey point data store with the sensor fingerprint, with information describing the sensor reading point, and with information that correlates the sensor reading point to the sensor fingerprint, and where establishing the second relationship comprises populating the survey point data store with information describing the sensor reading point, with information describing the survey plan, and with information that correlates the sensor reading point to the survey plan.

11. The method of claim 10, comprising updating the fingerprint observation data store with a registered survey point produced at a second, different time as part of a second, different survey.

12. A computer-readable storage medium storing computer-executable instructions that when executed by a computer control the computer to perform a method, the method comprising:

controlling the computer to acquire a venue map data set that describes a venue for which a survey is to be performed;

controlling the computer to extract a survey plan data set for the venue from the venue map data set;

controlling the computer to identify a survey path from the survey plan data set;

controlling the computer to identify a logical survey point located at the start of the survey path;

controlling the computer to identify a logical survey point located at the end of the survey path;

controlling the computer to produce instructions for positioning a surveyor at the logical survey point located at the start of the survey path and for directing the surveyor along the survey path to the logical survey point located at the end of the survey path;

providing the instructions to the surveyor;

controlling the computer to receive a set of sensor data from a sensor reading point on the survey path traversed by the surveyor; and populating a fingerprint observation data store with the set of sensor data, with information describing the sensor reading point, and with information for correlating the set of sensor data with the sensor reading point and the venue.

13. An apparatus, comprising:
a processor;
a memory;
a set of logics configured to perform sensor data collection as controlled by a decoupled survey plan; and
an interface to connect the processor, the memory, and the set of logics;
the set of logics comprising:
a first logic configured to access the decoupled survey plan for surveying an area located in a global positioning system dead zone, where the decoupled survey plan includes a point for which there is a co-ordinate based ground truth available and where the point is described with reference to a visual landmark without reference to the co-ordinate based ground truth;
a second logic configured to produce a radio frequency sensor based survey for the area located in the global positioning system dead zone based, at least in part, on the decoupled survey plan; and
a third logic configured to register the radio frequency sensor based survey to a map representing the area located in the global positioning dead zone.

14. The apparatus of claim 13, the first logic being configured to provide information concerning the decoupled survey plan as one of: a visual display on the apparatus, an audible transmission from the apparatus, or as instructions for directing the apparatus.

15. The apparatus of claim 14, the second logic being configured to produce the radio frequency sensor based survey by acquiring a series of sensor readings at a series of points along a path described in the decoupled survey plan, where the sensor readings include information from which a relative distance to the point for which a ground truth is available can be computed for members of the series of points.

16. The apparatus of claim 13, the third logic being configured to register the radio frequency sensor based survey to a second, different map representing an area located in the global positioning system dead zone as a function of a relationship between the point for which there is a ground truth, members of the series of points, and a point on the second, different map.

17. The apparatus of claim 14, comprising a fourth logic configured to selectively update the radio frequency sensor based survey using sensor data acquired during two or more different survey plan based sensor data collections of data from the global positioning system dead zone, where the two or more different survey plan based sensor data collections were performed at two or more different times as part of two or more different surveys.

* * * * *